(12) United States Patent
Nakazato et al.

(10) Patent No.: US 7,762,803 B2
(45) Date of Patent: Jul. 27, 2010

(54) CONTAINER, THERMO-MOLDING APPARATUS AND METHOD FOR THERMO-MOLDING THE SAME

(75) Inventors: Shinsaku Nakazato, Tokyo (JP); Yasuo Takeshita, Iwata-Gun (JP); Toshiyuki Yokoyama, Tokyo (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 0 days.

(21) Appl. No.: 12/007,454

(22) Filed: Jan. 10, 2008

(65) Prior Publication Data
US 2008/0118597 A1    May 22, 2008

Related U.S. Application Data

(62) Division of application No. 11/984,597, filed on Nov. 20, 2007, now abandoned, which is a division of application No. 10/491,959, filed as application No. PCT/JP02/11284 on Oct. 30, 2002, now abandoned.

(30) Foreign Application Priority Data

Oct. 30, 2001  (JP) .............................. 2001-332447
Sep. 30, 2002  (JP) .............................. 2002-286938

(51) Int. Cl.
 *B29C 43/56* (2006.01)
(52) U.S. Cl. .................... 425/388; 425/398; 425/405.1; 425/504
(58) Field of Classification Search ................. 425/388, 425/326.1, 398, 399, 504, 387.1, 405.1
See application file for complete search history.

(56) References Cited

U.S. PATENT DOCUMENTS 3,218,379  A    11/1965    Edwards (Continued)

FOREIGN PATENT DOCUMENTS

GB    2 079 668 A    1/1982

(Continued)

OTHER PUBLICATIONS

Office Action mailed Dec. 9, 2009 for U.S. Appl. No. 12/385,401.

(Continued)

*Primary Examiner*—Richard Crispino
*Assistant Examiner*—Thu Khanh T Nguyen
(74) *Attorney, Agent, or Firm*—Oliff & Berridge, PLC

(57) ABSTRACT

The present invention provides a bottomed cylindrical container, comprising a body wall, a bottom wall, and a ring-shaped foot downwardly extending from the bottom wall, said container being produced by thermo-molding a resin sheet, characterized in that said foot is formed by folding an inner wall by compressed fluid to be fusion-bonded with an outer wall, so as to form the foot comprising the inner wall and the outer wall. The present invention also provides a bottomed cylindrical container, comprising a body wall having a grounding edge at a lower end thereof, and a bottom wall, said container being produced by thermo-molding a resin sheet, characterized in that said bottom wall connects with an upper edge of an inner wall produced by folding back the body wall along the grounding edge and by fusion-bonding it to an inner periphery of the body wall. In addition, the present invention provides the methods for thermo-molding these containers and their apparatuses.

6 Claims, 9 Drawing Sheets

U.S. PATENT DOCUMENTS

| | | | |
|---|---|---|---|
| 3,234,310 A * | 2/1966 | Edwards | 264/522 |
| 3,338,997 A | 8/1967 | Tigner | |
| 3,465,071 A | 9/1969 | Edwards | |
| 4,872,590 A | 10/1989 | Sasaki et al. | |
| 5,062,568 A | 11/1991 | Hill et al. | |
| 6,315,150 B1 | 11/2001 | Takai et al. | |
| 6,440,354 B1 * | 8/2002 | Takai et al. | 264/550 |
| 7,582,249 B2 | 9/2009 | Iwasaki et al. | |

FOREIGN PATENT DOCUMENTS

| | | |
|---|---|---|
| JP | A 56-56822 | 5/1981 |
| JP | A 57-43807 | 3/1982 |
| JP | A 59-45113 | 3/1984 |
| JP | A 1-208116 | 8/1989 |
| JP | A 1-317740 | 12/1989 |
| JP | A 4-168031 | 6/1992 |
| JP | A 2000-225642 | 8/2000 |
| JP | A 2000-229351 | 8/2000 |
| JP | A 2001-1395 | 1/2001 |

OTHER PUBLICATIONS

European Search Report dated Oct. 22, 2009 for European Patent Application No. 02 77 9939.

* cited by examiner (a)

(b)

(a)

(b)

CONTAINER, THERMO-MOLDING APPARATUS AND METHOD FOR THERMO-MOLDING THE SAME

This is a Division of application Ser. No. 11/984,597 filed Nov. 20, 2007, now abandoned, which is a Division of application Ser. No. 10/491,959 filed Apr. 8, 2004, now abandoned, which in turn is a National Stage of International Application No. PCT/JP02/11284 filed Oct. 30, 2002. The disclosure of the prior applications is hereby incorporated by reference herein in its entirety.

BACKGROUND OF THE INVENTION

This invention relates to a container and a thermo-molding apparatus and a thermo-molding method for molding such a container. More particularly, the present invention relates to a legged and bottomed cylindrical thin wall container or a bottomed cylindrical container having the bottom wall connected to the inner barrel of the body section produced by folding the latter back at the grounding edge of the container, which is molded by thermo-molding and made free from any gap in the inside of the junction of the leg or the body inner barrel and the body wall, and also a thermo-molding apparatus and a thermo-molding method for molding such a container.

Legged and bottomed containers molded by thermo-molding a thermoplastic resin sheet and made free from any gap in the inside at the site corresponding to the leg shaped by bending the sheet and thermo-molding apparatus and thermo-molding methods for molding such bottomed containers are known to date. For example, Japanese Patent Laid-open Nos. 2000-225642 and 2001-001395 disclose such bottomed containers and thermo-molding apparatus and thermo-molding methods for molding such bottomed containers.

According to the above patent documents describing the prior art, a bottomed container is thermo-molded either by using a thermo-molding apparatus comprising an upper plug unit having a pressure molding plug and cooling male mold, and a unit of female mold including an upper mold for forming the mouth section and the body peripheral section of the container, an intermediate mold for forming the lower part of the body peripheral section and the outer peripheral surface of the bottom rim (or foot) and a bottom mold for forming the inner peripheral surface of the bottom rim and the bottom wall or by using a thermo-molding apparatus comprising a pressure molding plug, a female mold and a bottom mold.

More specifically, a container is molded by pushing the pressure molding plug into the female mold to shape the container so as to make it show the profile of the surface of the female mold, while holding the bottom mold to the lowered position, and subsequently raising the bottom mold to form the bottom wall and the bottom rim respectively on the upper surface of the bottom mold and between the bottom mold and the female mold.

The bottom rim is made either to flare toward the lower end and show a triangular cross section or to show a cylindrical profile that is vertically extending with a same diameter.

With the prior art, regardless if the bottom rim is flared or made to show a vertically extending cylindrical profile, the difference between the outer diameter of the upper end of the mold surface of the female mold (more particularly its intermediate mold) for forming the outer peripheral surface of the bottom rim and the outer diameter of the mold surface of the bottom mold for forming the inner peripheral surface of the bottom rim is greater than the thickness of the resin sheet and slightly smaller than the twice of the thickness because the bottom rim is formed between the mold surface of the mold surface of the female mold (more particularly its intermediate mold) and that of the bottom mold.

Therefore, if twice of the resin sheet that is used for producing the container is smaller than the difference of the diameters, a gap is produced along the inner surface of the container at the site that corresponds to the bottom rim.

This means that, with either of the above described thermo-molding apparatus and the corresponding molding method, it is not feasible to use resin sheets having different thicknesses and particularly thin resin sheets cannot be used.

If thin resin sheets are to be used, the difference between the outer diameter of the upper end of the mold surface of the female mold (more particularly its intermediate mold) for forming the outer peripheral surface of the bottom rim and the outer diameter of the mold surface of the bottom mold for forming the inner peripheral surface of the bottom rim needs to be reduced.

Additionally, the thickness of resin sheet can show variances in the stages before forming the bottom rim because the thickness of the original roll, the thermo-molding temperature, the degree of vacuum and the timing of applying compressed air can vary significantly. Therefore, it is very difficult to constantly maintain the molding conditions that make the thickness of the bent resin sheet slightly greater than the gap between the metal molds.

Thus, while the above described problem may be relatively insignificant when molding a large container by using a thick resin sheet, the thickness may have to be more rigorously controlled when a relatively thin resin sheet is used. In other words, the prior art is not suited for molding small containers.

SUMMARY OF THE INVENTION

Therefore, it is the object of the present invention to dissolve the above identified problem and provide a legged and bottomed cylindrical container having no gap in the inside of the foot or a bottomed cylindrical container having no gap between the inner barrel of the body produced by bending the original resin sheet at the grounding edge and the body wall, a thermo-molding apparatus and a thermo-molding method for molding such a container.

According to the invention, the above object is achieved by providing a bottomed cylindrical container, comprising a body wall, a bottom wall, and a ring-shaped foot downwardly extending from the bottom wall, said container being produced by thermo-molding a resin sheet; characterized in that said foot is formed by folding an inner wall by compressed fluid to be fusion-bonded with an outer wall, so as to form the foot comprising the inner wall and the outer wall. Preferably, said bottom wall comprises a central section and a peripheral section, and the peripheral portion is made thin.

According to another aspect of the invention, the above object is achieved by providing a bottomed cylindrical container, comprising a body wall having a grounding edge at a lower end thereof, and a bottom wall, said container being produced by thermo-molding a resin sheet, characterized in that said bottom wall connects with an upper edge of an inner wall produced by folding back the body wall along the grounding edge and by fusion-bonding it to an inner periphery of the body wall.

The present invention also provides an apparatus for thermo-molding a resin sheet to a bottomed cylindrical container, comprising an upper mold having a plug, and a lower mold having a female mold and a bottom bush; wherein said female mold has mold surfaces for forming a body wall of the container; and said bottom bush has compressed air blow-in holes. Also, it provides an apparatus for thermo-molding a resin sheet to a bottomed cylindrical container with a ring-shaped foot, comprising an upper mold having a plug, and a lower mold having a female mold and a bottom bush, wherein; said female mold is provided with suction holes; said female mold has a mold surface for forming a body wall of the container, a mold surface for forming a bottom peripheral wall of the container, and a mold surface for forming an outer wall of the foot; and said bottom bush has compressed fluid blow-in holes. Preferably, said lower mold comprises a mold base, the bottom bush in the mold base, and the female mold on the mold base; a gap is formed between a lower surface of the female mold and the mold base; and an annular suction groove is formed between a lower surface of the female mold and the mold base, and communicates with the gap.

Another aspect of the present invention provides a method for thermo-molding a footed and bottomed cylindrical container; comprising heating a thermoplastic resin sheet; pressing the heated sheet by a plug of an upper mold with vacuum-sucking, to contact the sheet with mold surfaces of a female mold of a lower mold, so as to form a body wall and an outer wall of a foot of the container; and blowing compressed fluid through blow-in holes of a bottom bush of the lower mold into the female mold with vacuum-sucking, to contact the sheet on a top surface of the bottom bush with a bottom surface of the plug, so as to form a bottom wall and an inner wall of the foot, said inner wall being fusion-bonded with the outer wall.

Still another aspect of the present invention provides a method for thermo-molding a bottomed cylindrical container; comprising heating a thermoplastic resin sheet; pressing the heated sheet by a plug of an upper mold with vacuum-sucking, to contact the sheet with mold surfaces of a female mold of a lower mold, so as to form a body wall of the container; and blowing compressed fluid through blow-in holes of a bottom bush of the lower mold into the female mold with vacuum-sucking, to contact the sheet on a top surface of the bottom bush with a bottom surface of the plug, so as to form a bottom wall and an inner wall being fusion-bonded with the body wall.

DESCRIPTION OF THE PREFERRED EMBODIMENTS

Now, the present invention will be described in detail by referring to the accompanying drawings that illustrate preferred embodiments of the invention.

Firstly, the first embodiment of footed and bottomed cylindrical container or footed bowl-shaped container A will be described.

Figure 1:
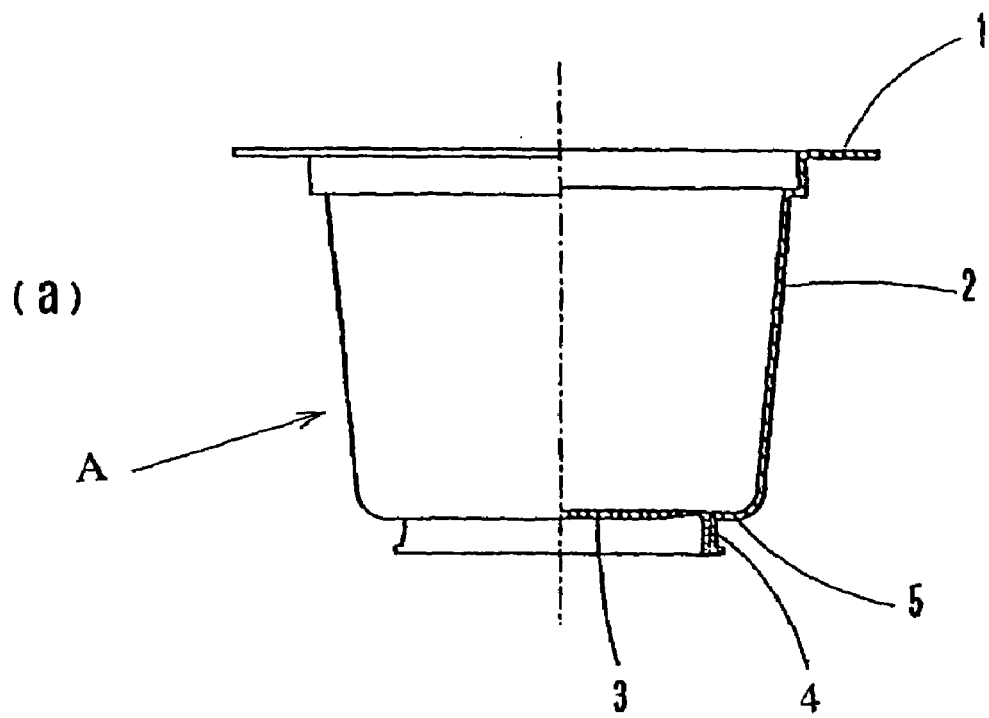
FIG. 1A is a schematic front view of the first embodiment of legged and bottomed container according to the invention, showing it partly in cross section.
FIG. 1B is an enlarged partial view of the embodiment, showing a principal part thereof.
Figure 1:
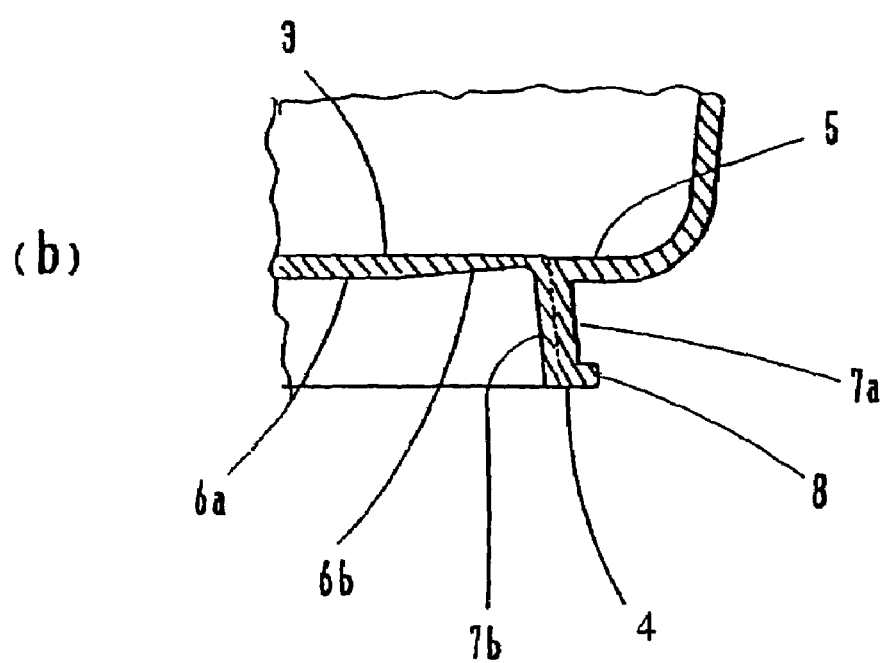

As shown in FIG. 1, a footed and bottomed cylindrical container A comprises a body wall 2 having an outwardly directed flange 1 arranged along a peripheral edge of a top opening, a bottom wall 3, and a ring-shaped foot 4 extending downwardly from the bottom wall 3.

The body wall 2 is curved inwardly at and near a lower end thereof until it becomes horizontal and reaches to the foot 4. Such horizontal part is a bottom peripheral wall 5 which connects to the bottom wall 3. The bottom wall 3 is located within the foot 4, and comprises a central section 6a and a thin peripheral section 6b.

The foot 4 comprises an outer wall 7a and an inner wall 7b which is produced by inwardly folding back the outer wall 7a along at a lower edge thereof and welded to the outer wall. An outwardly bulge 8 is formed along a lower peripheral edge of the foot 4.

Preferable resin materials that can be used for forming the container A include poly-olefin type resins such as polypropylene (PP) and polyethylene (PE), although other thermo-moldable synthetic resin materials or thermoplastic resin material such as polythyleneterephthalate (PET) can also suitably be used. The synthetic resin sheet to be used for molding may be of single layer or of multilayer (or laminate).

The synthetic resin sheet to be used for molding has a thickness between 0.3 and 3.0 mm, while the wall thickness of the body wall of the container obtained by thermo-molding the sheet is between about 0.1 and about 0.45 mm.

Now, the first embodiment of thermo-molding apparatus B to be used for thermo-molding the first embodiment of container will be described.

Figure 2:
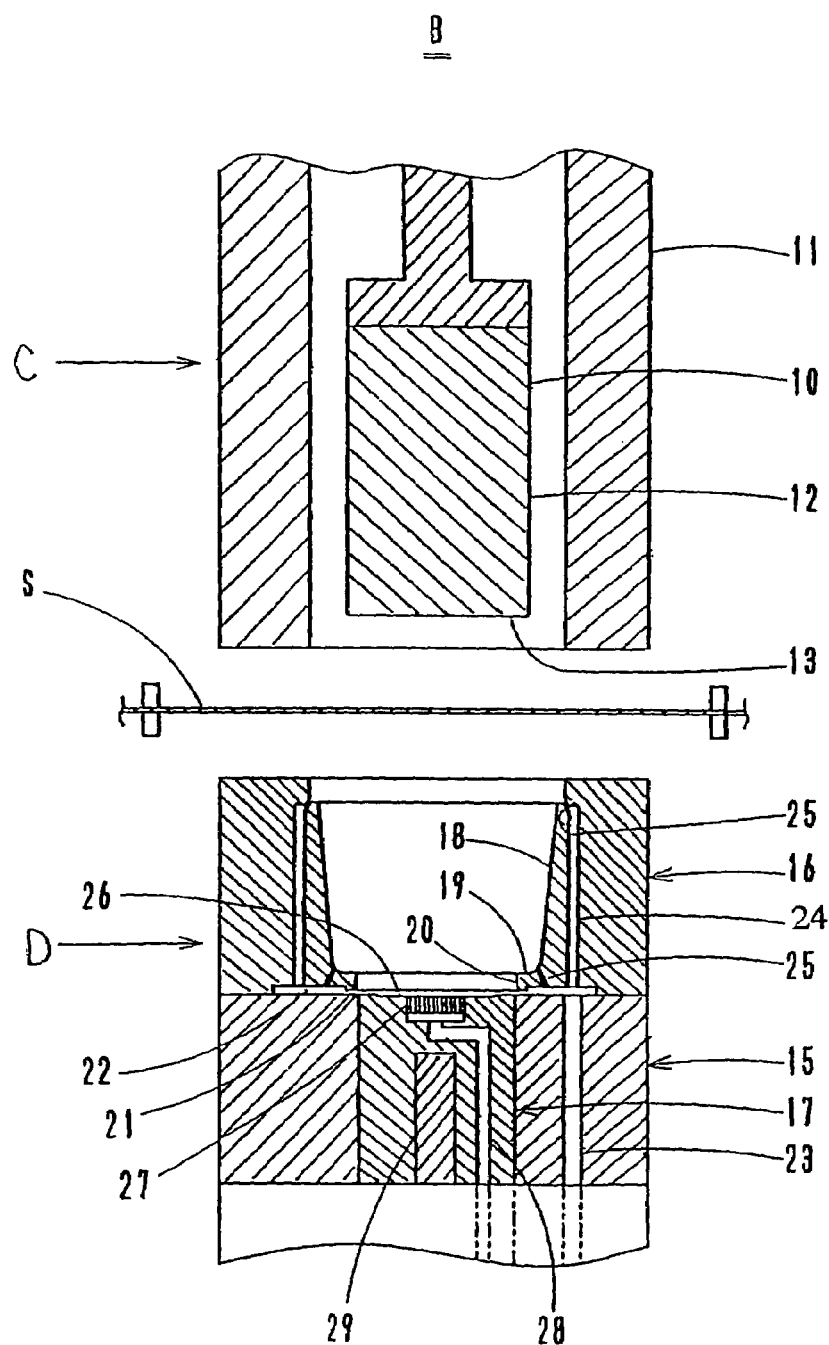
FIG. 2 is a schematic front view of the first embodiment of thermo-molding apparatus according to the invention, showing it partly in cross section.

As shown in FIG. 2, the thermo-molding apparatus B comprises an upper mold C and a lower mold D.

The upper mold C comprises a cylindrical clamp 11 for pinching the sheet S, and a plug 10 vertically movable relative to the clamp 11. The sheet S is heated by a heater (not shown). The clamp 11 is not limited to cylindrical shape.

The plug 10 has a cylindrical wall surface 12 and a flat bottom surface 13. While the clamp 11 is so designed that compressed fluid (such as compressed air) is blown into it from above, it is not essential to blow compressed fluid into the clamp 11.

While the plug 10 of the illustrated embodiment shows a cylindrical profile, it may alternatively show some other profile such as a conical profile. Similarly, while the bottom surface 13 of plug of the illustrated embodiment is flat, it may alternatively be outwardly or inwardly curved depending on the molded product to be produced by using it.

The lower mold D comprises a mold base 15, a female mold 16 arranged on the mold base 15, and a bottom bush 17 arranged in an inside of the mold base 15.

The female mold 16 has a mold surface 18 for forming the body wall 2 of the container A to be molded, a mold surface 19 for forming the bottom peripheral wall 5, and a mold surface 20 for forming the outer peripheral surface of the foot 4. A passage 21 is arranged at the lower peripheral edge of the mold surface 20, so that a gap 21 is provided between the lower surface of the female mold 16 and the mold base 15. The gap 21 communicates with an annular suction groove 22.

The suction groove 22 communicates with a connection hole 23 arranged in the mold base 15. The connection hole 23 communicates with a vacuum unit (not shown). The female mold 16 is provided with a communication hole 24. The communication hole 24 communicates with the connection hole 23. A number of suction holes 25 are arranged near the upper edge and along the lower edge of the mold surface 18 of the female mold 16, and each of the suction holes 25 communicates with the communication hole 24. Thus, air can be drawn from the inside of the female mold 16 through the connection hole 23, the suction groove 23, the gap 21 and the suction holes 25.

A number of blow-in holes 27 are formed at a center of the top surface 26 of the bottom bush 17. A connection hole 28 is formed in the bottom bush 17, and communicates with a source of compressed fluid (not shown). Thus, compressed fluid is blown into the inside of the female mold 16 through the communication hole 28 and the blow-in holes 27.

The bottom bush 17 is provided with a heater 29.

Now, the method of thermo-molding the container according to the first embodiment of the invention will be described below.

For the purpose of thermo-molding, the sheet S is heated by a heater (not shown) to the molding temperature that is somewhat lower than a melting point of the synthetic resin. The female mold 16 and the bottom bush 17 of the thermo-molding apparatus B are also heated and maintained to a predetermined temperature level (usually about 80 to about 150° C., about 50 to about 180° C. depending on the material of the sheet) by the heater 29. In this case, the temperature of the female mold 16 and the bottom bush 17 should be controlled not to cool the heated sheet.

If the resin sheet S is made of PP and has a thickness of 1.0 mm, it is heated to about 140 to 200° C.

Figure 3:
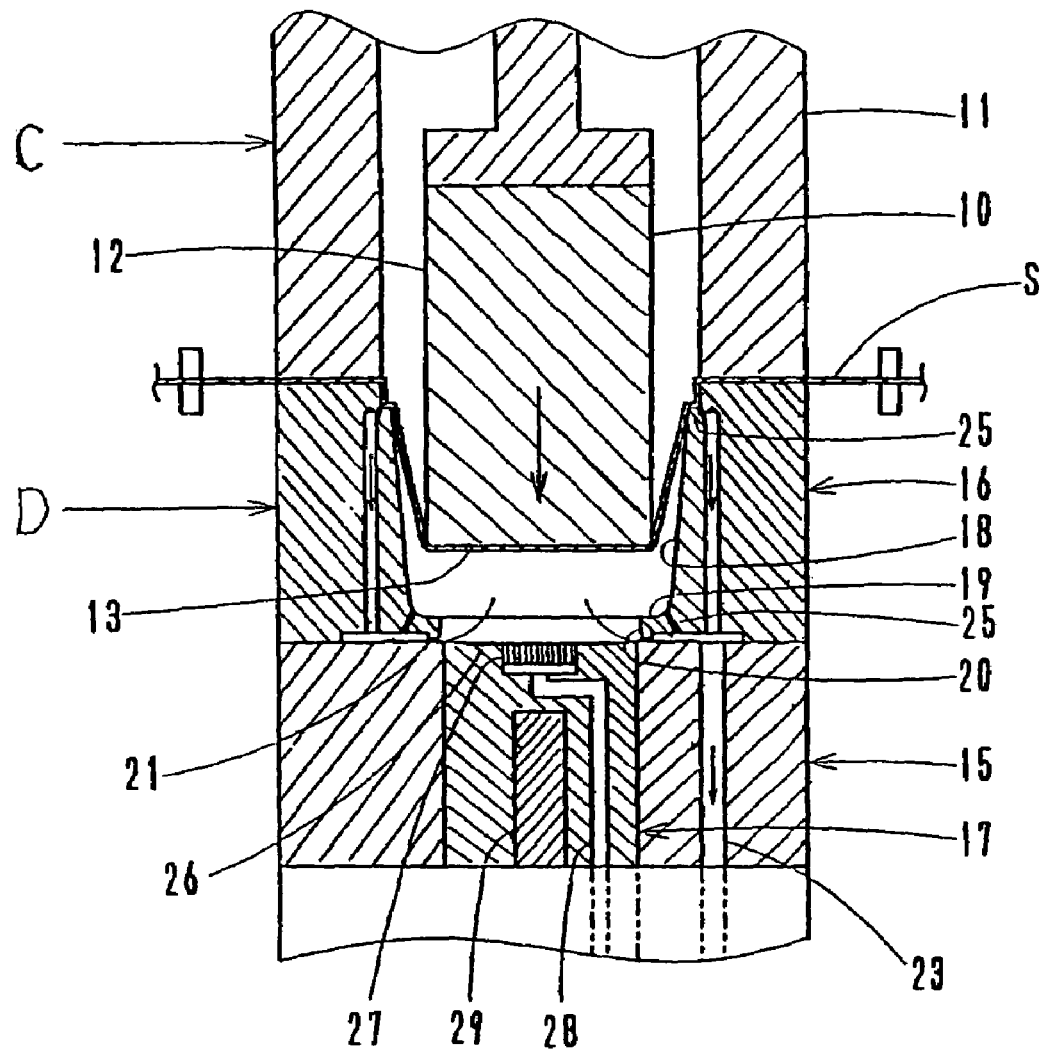
FIG. 3 is a schematic front view of the first embodiment of thermo-molding apparatus of FIG. 2, showing it partly in cross section and illustrating the state where the molds are closed and the plug is made to start lowering.

The upper mold C is lowered, and the lower mold is raised from the state of FIG. 2. As shown in FIG. 3, the heated sheet becomes pinched and pressed between the clamp 11 of the upper mold C and the top surface of the female mold 16 of the lower mold D. The plug 10 is further lowered relative to the clamp 11, the sheet S is forced to extend downwardly by the lower surface 13 of the plug 10, because the sheet is already heated and softened. At this time, since air is drawn through the gap 21 and the suction holes 25, the sheet S is drawn by the suction holes 25, and comes to be held in tight contact with the inner surface of female mold above the suction holes 25. At this time, compressed fluid may be blown into the clamp 11 from above.

Figure 4:
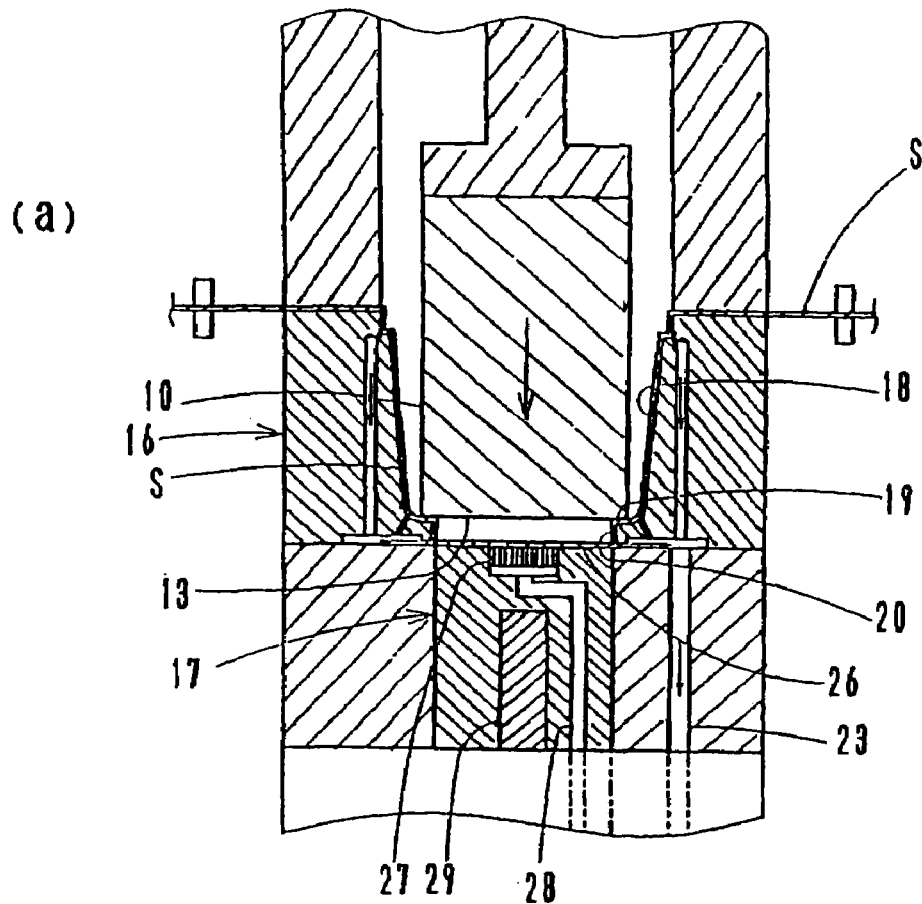
FIG. 4A is a schematic front view of the first embodiment of thermo-molding apparatus of FIG. 2, showing it partly in cross section and illustrating the state where the plug reaches the lowest position and the vacuum molding operation is completed.
FIG. 4B is an enlarged partial view of the embodiment of FIG. 4A.
Figure 4:
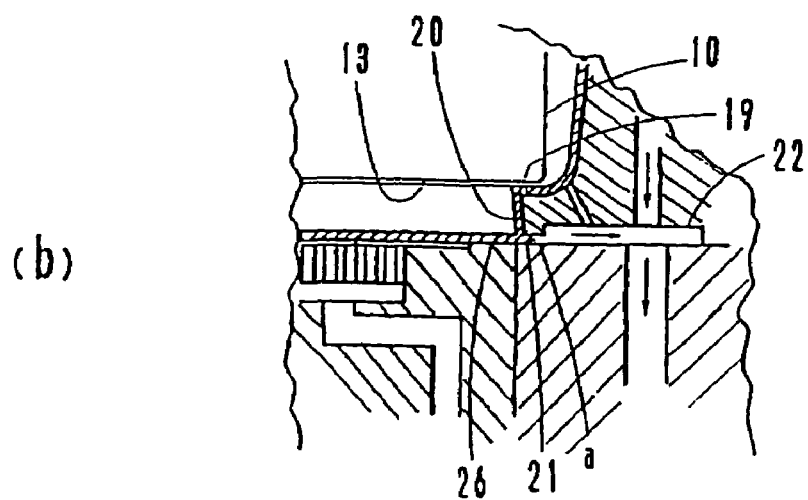

When the plug 10 is further lowered, the sheet S comes to be held in tight contact with the mold surfaces 18, 19, 20 of the female mold 16 and the top surface 26 of the bottom bush 17, as illustrated in FIG. 4. Thus, the sheet S is molded by the mold surfaces 18, 19, 20 and the top surface 26, to produce the body wall 2, the bottom peripheral wall 5 and the outer wall 7a of the foot 4 of the container A.

As shown in FIGS. 4A and 4B, the plug 10 is stopped before it contacts with the mold surface 19. As a result, a gap is formed between the sheet S on the mold surface 19 and the lower surface 13 of the plug 10. Air is drawn out through the gap when compressed air is blown into the female mold 16 in a subsequent step as will be described hereinafter. In the case of the illustrated embodiment, the gap is about 0.1 to 0.5 mm.

By the above described vacuum sucking, resin "a" is drawn into the gap 21 to produce the bulge 8 of the container. Since the resin "a" is drawn into the gap 21, the gap 21 is filled with the resin, so that eventually no resin is further drawn into the gap 21 any more. The bottom bush 17 is heated to the above described predetermined temperature level by the heater 29, and the part of the sheet S that contacts with the top surface 26 of the bottom bush 17 is held to the molding temperature that is close to the melting point.

Figure 5:
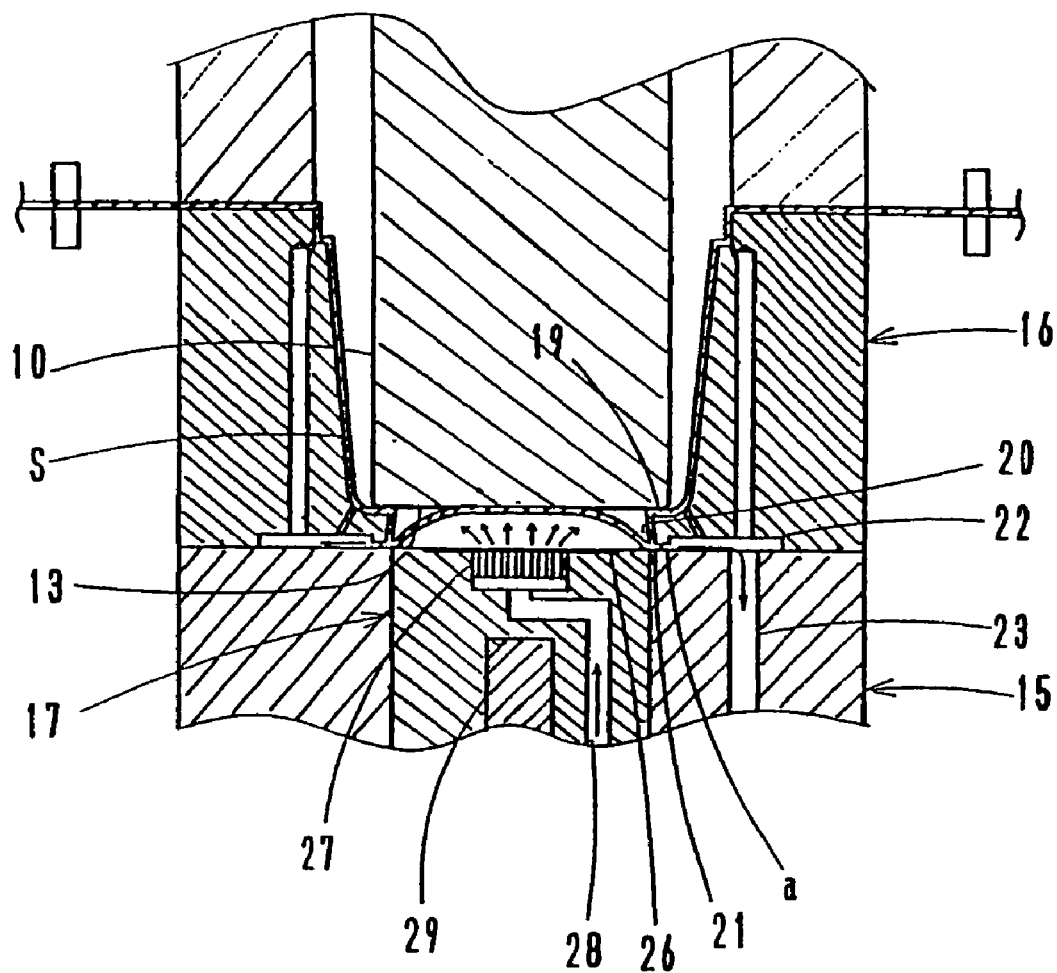
FIG. 5 is a schematic front view of the first embodiment of thermo-molding apparatus of FIG. 2, showing it partly in cross section and illustrating the state the bottom of the container is molded by applying compressed air.
Figure 6:
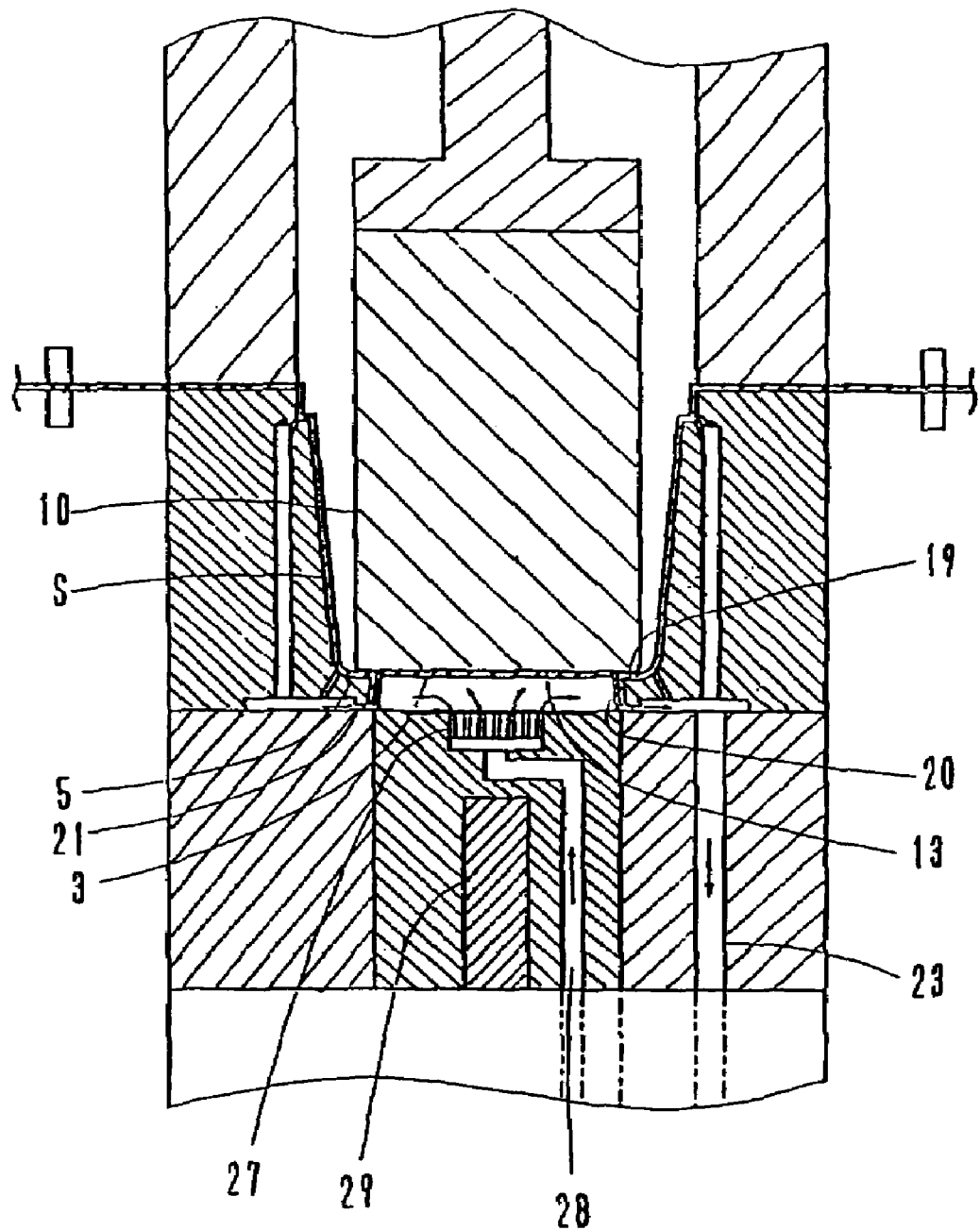
FIG. 6 is a schematic front view of the first embodiment of thermo-molding apparatus of FIG. 2, showing it partly in cross section and illustrating the state where the operation of molding the bottom of the container by applying compressed air is completed.

As described above, the sheet S is pressed and held in contact with the mold surface 19 as a result of the air suction through the suction holes 25 for producing vacuum (and due to the compressed air in the clamp 11, if desired), the resin "a" of the lower end of the sheet S is drawn into the gap 21, and the part of the sheet S that is held in contact with the top surface 26 is held to the molding temperature that is close to the melting point. Under these circumstances, when compressed fluid is blown into the female mold 16 through the blow-in holes 27, the part of the sheet S with the temperature level close to the melting point is folded back along the lower edge of the outer wall 7a, and is moved upwardly, as illustrated in FIG. 5. Thus, the central portion of the part of the sheet S with the temperature level close to the melting point is brought into tight contact with the bottom surface 13 of the plug 10, while the peripheral portion is folded back along the lower edge of the outer wall 7a, and drawn to come into tight contact with and fusion-bonded to the outer wall 7a. In this way, the foot 4 is formed by fusion-bonding the outer wall 7a and the inner wall 7b as integral parts thereof. FIG. 6 schematically illustrates a state where the operation of producing the footed and bottomed cylindrical container by molding is completed.

At this time, since the peripheral part of the sheet S is expanded, the peripheral section 6b of the molded bottom wall 3 shows a thickness smaller than the central section 6a. Besides, since the temperature of the sheet is maintained to a level close to the melting point, the folded portion is fusion-bonded to the portion of the sheet S that is held in tight contact with the mold surface 20.

The central section can be made thin by using a plug having an upwardly curved lower surface for the molding operation using compressed air.

The thus formed container A is then cooled, and removed from the mold. Subsequently, the outwardly directed flange 1 is formed by cutting in a desired profile, to complete the operation of producing the footed and bottomed cylindrical container A.

The inner wall 7b and the outer wall 7a of the foot 4 of the obtained container A are in a completely fusion-bonded. In other words, they are integrally formed without any gap. It is a thin wall container whose body wall 2 and the bottom wall 3 are about 0.2 mm thick.

The above described first embodiment can be modified as follows.

In the above described embodiment, the plug 10 is stopped before it contacts the mold surface 19 of the female mold 16, and a gap is formed between the sheet S on the mold surface 19 and the lower surface 13 of the plug 10, to allow the air (between the sheet S on the bush 17 and the lower surface 13) left there to be drawn out. Alternatively, the plug 10 may be replaced by a plug 10 having a vent arranged between the lower surface 13 and the cylindrical wall surface 12. In such modification, the lower surface 13 of the plug 10 presses the sheet S against the mold surface 19 for forming the bottom peripheral wall.

When the compressed fluid is blown through the blow-in holes 27 in this modified embodiment, air between the sheet S on the bottom bush 17 and the bottom surface 13 can be removed by the above described vent.

Still alternatively, if the bottom surface 13 of the plug 10 is stopped further before the mold surface 19 of the female mold 16 to produce a gap of 0.5 to 1.5 mm between itself and the sheet surface after the vacuum forming, and if the compressed fluid is blown through the blow-in holes 27, the bottom wall 3 will project above the bottom peripheral wall 5 by pressure forming.

Now, the second embodiment of the container, the thermo-molding apparatus and the thermo-molding method to be used for molding the container will be described below.

This embodiment of the invention relates to a bottomed cylindrical container (cup-shaped container).

Figure 7:
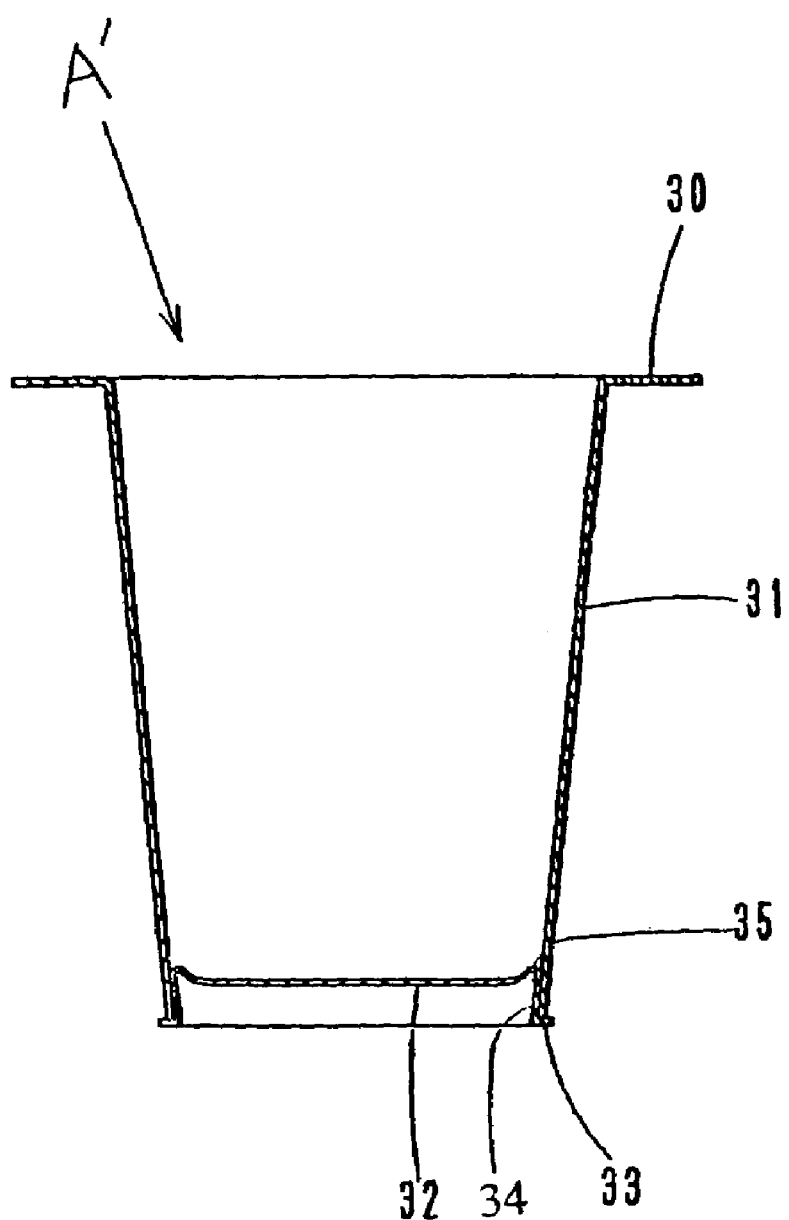
FIG. 7 is a schematic front view of the second embodiment of legged and bottomed container according to the invention, showing it partly in cross section.

Referring to FIG. 7, A' denotes the bottomed cylindrical container that comprises a body wall 31 having an outwardly directed flange 30 arranged along a peripheral edge of the opening, and a bottom wall 32.

A lower end of the body wall 31 is a grounding edge 33 of the container. The body wall 31 is inwardly folded back along the grounding edge 33 to produce an inner wall 34. A top edge 35 of the inner wall 34 connects to the bottom wall 32.

The inner wall 34 is fusion-bonded or welded to an inner periphery of the part of the body wall 31 located under the top edge 35, and no gap is found between the body wall 31 and the inner wall 34.

The method of thermo-molding the container according to the second embodiment of the invention will be described below.

The thermo-molding apparatus in the second embodiment is obtained by modifying the lower mold of the first embodiment of the invention. Therefore, the components that are same as those of the first embodiment are denoted by the same reference numerals and affixed by "a". The differences of the second embodiment and the first embodiment will be described specifically.

Figure 8:
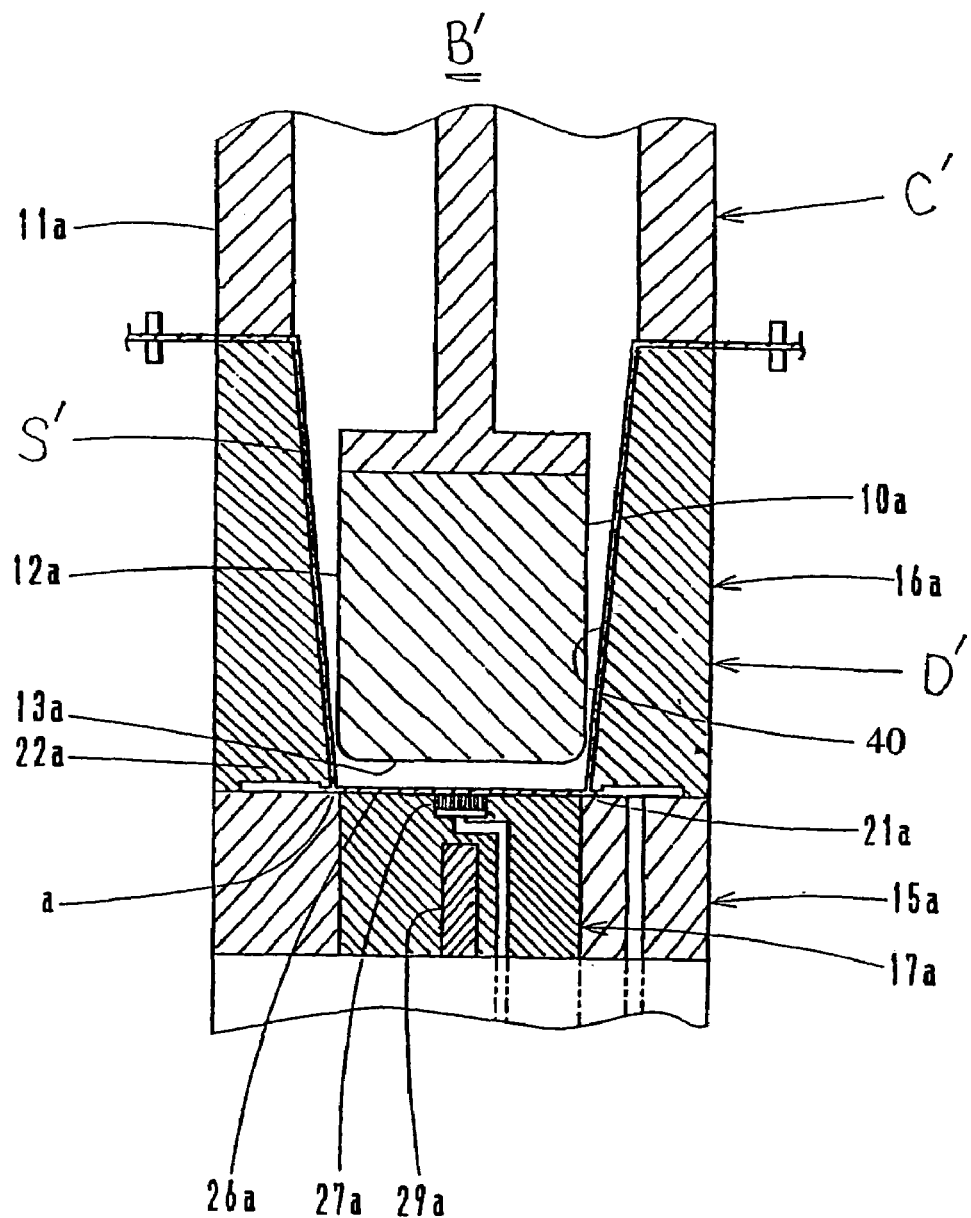
FIG. 8 is a schematic front view of the second embodiment of thermo-molding apparatus, showing it partly in cross section and illustrating the state where the plug reaches the lowest position and the vacuum molding operation is completed.

Referring to FIG. 8, reference symbol C' denotes the upper mold, and D' denotes the lower mold.

As in the case of the above described first embodiment, the upper mold C' comprises a cylindrical clamp 11a and a plug 10a vertically movable relative to the clamp 11a. The sheet S' is heated by a heater (not shown). The plug 10a has a cylindrical wall surface 12a and a flat bottom surface 13a. While the clamp 11a is so designed that compressed fluid (such as compressed air) is blown into it from above, it is not essential to blow compressed fluid into the clamp 11a.

The lower mold D' comprises a mold base 15a, a female mold 16a arranged on the mold base 15a, and a bottom bush 17a arranged in an inside of the mold base 15a.

The female mold 16a has a mold surface 40 for forming the body wall 31 of the container A' to be molded. A passage 21a is arranged at the lower peripheral edge of the mold surface 40, so that a gap 21a is provided between the lower surface of the female mold 16a and the mold base 15a. The gap 21a communicates with an annular suction groove 22a, which suction groove 22a communicates with a vacuum device (not shown).

A number of blow-in holes 27a are formed at a center of the top surface 26a of the bottom bush 17a. The blow-in holes 27a communicate with a source of compressed fluid (not shown).

The bottom bush 17a is provided with a heater 29a.

Now, the method of thermo-molding the container according to the second embodiment of the invention will be described below.

For the purpose of thermo-molding, the sheet S' is heated by a heater (not shown) to the molding temperature that is somewhat lower than the melting point of the synthetic resin. The female mold 16a and the bottom bush 17a of the thermo-molding apparatus B' are also maintained to the above described predetermined temperature level by the heater 29a.

The heated sheet S' is pinched and pressed between the clamp 11a of the upper mold C' and the top surface of the female mold 16a of the lower mold D'. The plug 10a is further lowered relative to the clamp 11a, the sheet S' is forced to extend downwardly by the lower surface 13a of the plug 10a, because the sheet is already heated and softened. At this time, compressed air is blown from the above, and air is drawn through the gap 21a on the lower surface of the female mold 16a to produce vacuum, so that the sheet S' is drawn by the gap 21a. As a result, the sheet S' comes to be held in tight contact with mold surface 40 of female mold 16a.

The plug 10a is further lowered and stopped before it contacts with the mold surface 40 of the female mold 16a, as shown in FIG. 8. As a result, the sheet S' is brought into tight contact with the mold surface 40 of the female mold 16a and the top surface 26a of the bottom bush 17a, and molded to show a profile defined by the mold surface 40 of the female mold 16a and the top surface 26a of the bottom bush 17a. At this time, the sheet produces portions that become the body wall 31 and the bottom wall 32 of the container A'.

As in the case of the above described first embodiment, resin a is drawn into the gap 21a by the air drawing operation or the vacuum sucking. The bottom bush 17a is heated to the above described predetermined temperature level by the heater 29a. The part of the sheet that contacts with the top surface 26a of the bottom bush 17a is held to the molding temperature that is close to the melting point.

Figure 9:
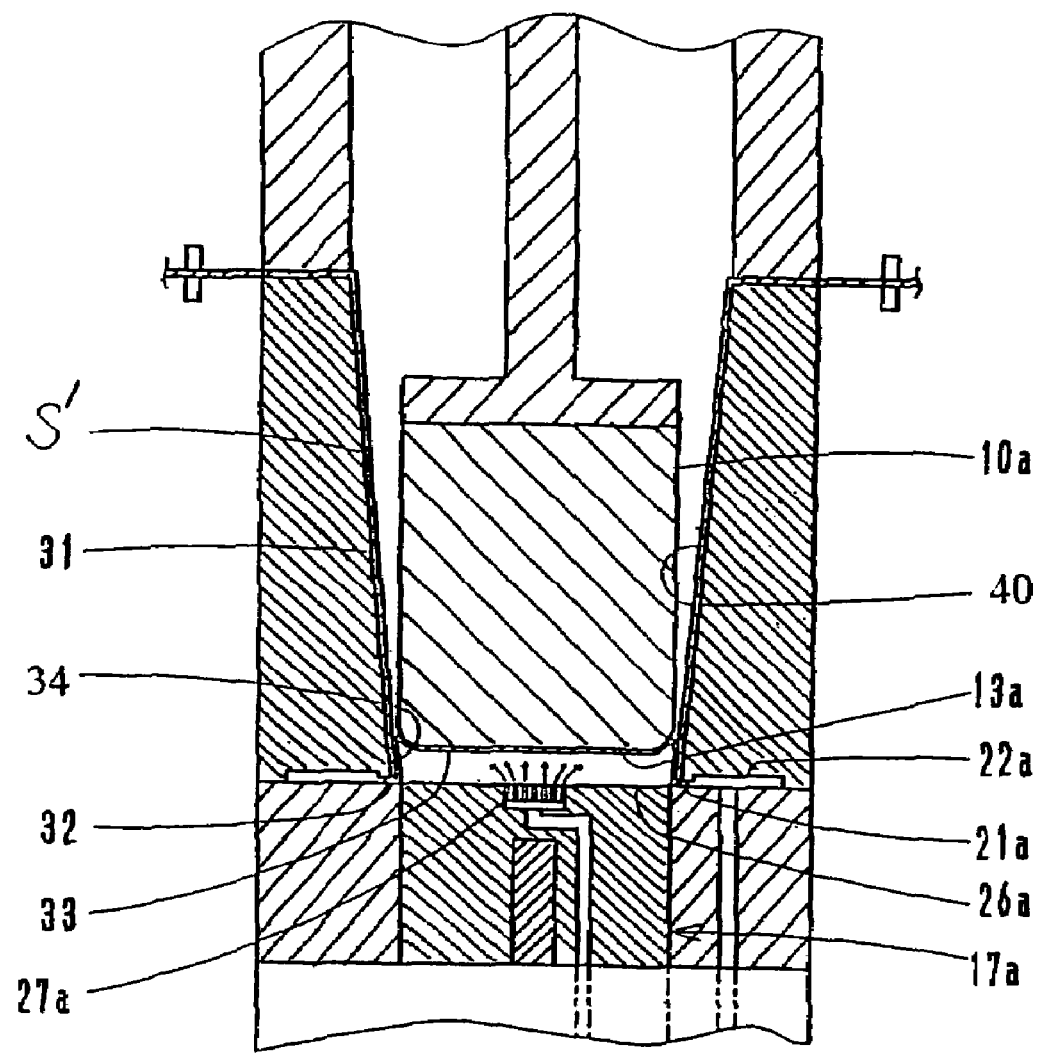
FIG. 9 is a schematic front view of the second embodiment of thermo-molding apparatus of FIG. 8, showing it partly in cross section and illustrating the state where the operation of molding the bottom of the container by applying compressed air is completed.

In this way, by the vacuum sucking and the compressed fluid, the sheet S' is pressed between the mold surface 40 and the top surface 26a of the bottom bush 17a, and the resin "a" of the lower end portion of the body wall 31 of the sheet S' is drawn into the gap 21a. Then, as shown in FIG. 9, compressed air is blown into through the blow-in holes 27a of the bottom bush 17a. The portion of the sheet held on the top surface 26a is folded back along the grounding edge 33. In this case, the central portion of the sheet is brought into tight contact with the bottom surface 13a of the plug 10a, while the peripheral portion of the sheet is brought into tight contact with and fusion-bonded to the inner peripheral surface of the body wall 31. Thus, as shown in FIG. 7, a bottomed cylindrical container A' whose inner wall 34 produced by folding back along the grounding edge 33 of the body wall 31 is fusion-bonded to the body wall 31 is obtained.

The present invention provides the following advantages.

A footed and bottomed cylindrical container according to the invention does not have any gap on the inner surface of the container at a site corresponding to the foot where food can enter.

In a bottomed cylindrical container according to the invention, the inner wall produced by folding back the body wall along the grounding edge thereof is welded to the body wall and hence no gap where food can enter is produced there.

When a bottomed cylindrical container according to the invention is filled with hot food, sealed and then cooled to reduce the inner pressure, the bottom wall of the container operates to absorb the impact of pressure reduction to prevent any deformation or recession of the sealed surface because the container has a thin the bottom wall, or at least a then peripheral portion in the bottom wall.

Since a thermo-molding method and a thermo-molding apparatus according to the invention is adapted to mold a ring-shaped foot or a bottom wall by using compressed air and welding the resin layer of the inner peripheral portion and that of the outer peripheral portion of the foot for a bottomed cylindrical container, the foot is formed without gap if the thickness of the material resin sheet fluctuates. Similarly, since the inner wall produced by folding back the body wall along the grounding edge thereof and welded to the body wall for a cup-shaped container, no gap is formed between the body wall and the inner wall if the thickness of the material resin sheet fluctuates.

Therefore, containers showing a same profile can be produced by using different material resin sheets that may have different thicknesses by means of a same thermo-molding apparatus.

Thus, containers having a small wall thickness can be produced by using a thin material resin sheet to save the material depending on the applications of the containers.

Since the present invention imposes no restrictions on the thickness of the material resin sheet, a bottomed cylindrical container can be produced simply by bringing the bottom surface of the plug of a thermo-molding apparatus according to the invention into contact with or close to the mold surface of the peripheral wall of the bottom of the female mold of the apparatus regardless of the size of container.

Small containers can be produced by using a thin material resin sheet.

What is claimed is:

1. An apparatus for thermo-molding a resin sheet into a bottomed cylindrical container, comprising:
    an upper mold comprising a plug; and
    a lower mold comprising:
        a mold base,
        a female mold arranged on the mold base, the female mold having a first mold surface for forming a body wall of the bottomed cylindrical container and a second mold surface for forming a bottom peripheral wall of the bottomed cylindrical container, and
        a bottom bush provided with compressed air blow-in holes and arranged inside of the mold base, wherein:
    a gap is arranged at a lower peripheral edge of the second mold surface such that the gap is provided between a lower surface of the female mold and the mold base, and
    an annular suction groove is formed between the lower surface of the female mold and the mold base and communicates with the gap.

2. An apparatus for thermo-molding a resin sheet into a bottomed cylindrical container with a ring-shaped foot, comprising:
    an upper mold comprising a plug; and
    a lower mold comprising:
        a mold base,
        a female mold provided with suction holes and arranged on the mold base, the female mold having a first mold surface for forming a body wall of the bottomed cylindrical container, a second mold surface for forming a bottom peripheral wall of the bottomed cylindrical container, and a third mold surface for forming an outer peripheral surface of the ring-shaped foot of the bottomed cylindrical container, and
        a bottom bush provided with compressed air blow-in holes and arranged inside of the mold base, wherein:
    a gap is arranged at a lower peripheral edge of the third mold surface such that the gap is provided between a lower surface of the female mold and the mold base, and
    an annular suction groove is formed between the lower surface of the female mold and the mold base and communicates with the gap.

3. The apparatus according to claim 1, wherein the annular suction groove communicates with a connection hole provided inside the mold base and the connection hole communicates with a vacuum unit.

4. The apparatus according to claim 3, wherein the female mold being provided with a communication hole that is in communication with the connection hole inside the mold base and suction holes that are arranged near an upper edge and a lower edge of the first mold surface.

5. The apparatus according to claim 2, wherein the annular suction groove communicates with a connection hole provided inside the mold base and the connection hole communicates with a vacuum unit.

6. The apparatus according to claim 5, wherein the female mold being provided with a communication hole that is in communication with the connection hole inside the mold base and the suction holes that are arranged near an upper edge and a lower edge of the first mold surface.

* * * * *